United States Patent
Sawant

(10) Patent No.: US 8,413,061 B2
(45) Date of Patent: Apr. 2, 2013

(54) SYNCHRONOUS TO ASYNCHRONOUS WEB PAGE CONVERSION

(75) Inventor: Nitin M. Sawant, West Mumbai (IN)

(73) Assignee: Accenture Global Services Limited, Dublin (IE)

( * ) Notice: Subject to any disclaimer, the term of this patent is extended or adjusted under 35 U.S.C. 154(b) by 689 days.

(21) Appl. No.: 12/534,927

(22) Filed: Aug. 4, 2009

(65) Prior Publication Data

US 2010/0037150 A1 Feb. 11, 2010

(30) Foreign Application Priority Data

Aug. 5, 2008 (IN) .......................... 1660/MUM/2008

(51) Int. Cl.
*G06F 3/00* (2006.01)
(52) U.S. Cl. ......... 715/753; 715/239; 715/760; 715/765
(58) Field of Classification Search .................. 715/753, 715/760, 239
See application file for complete search history.

(56) References Cited

U.S. PATENT DOCUMENTS

| | | | | |
|---|---|---|---|---|
| 5,968,125 | A * | 10/1999 | Garrick et al. ................. | 709/224 |
| 6,353,839 | B1 * | 3/2002 | King et al. ..................... | 715/236 |
| 6,643,621 | B1 * | 11/2003 | Dodrill et al. ................. | 704/275 |
| 6,938,170 | B1 * | 8/2005 | Kraft et al. ....................... | 726/23 |
| 7,234,145 | B2 * | 6/2007 | Wagner .......................... | 719/310 |
| 7,546,590 | B2 * | 6/2009 | Stone et al. ................... | 717/137 |
| 7,665,064 | B2 * | 2/2010 | Able et al. .................... | 717/117 |
| 7,861,213 | B2 * | 12/2010 | Wang ............................ | 717/100 |
| 8,079,025 | B2 * | 12/2011 | Marchant ...................... | 717/166 |
| 2002/0013790 | A1 * | 1/2002 | Vandersluis ................... | 707/514 |
| 2003/0005411 | A1 * | 1/2003 | Gerken ......................... | 717/120 |
| 2003/0172145 | A1 * | 9/2003 | Nguyen ......................... | 709/223 |
| 2005/0198618 | A1 * | 9/2005 | Lalonde et al. ................ | 717/110 |
| 2005/0256882 | A1 * | 11/2005 | Able et al. ....................... | 707/10 |
| 2006/0112340 | A1 * | 5/2006 | Mohr et al. .................... | 715/733 |
| 2007/0057911 | A1 * | 3/2007 | Fateh ............................. | 345/156 |
| 2007/0198924 | A1 * | 8/2007 | Koike et al. ................... | 715/526 |
| 2007/0214239 | A1 * | 9/2007 | Mechkov et al. ............. | 709/219 |
| 2007/0226314 | A1 | 9/2007 | Eick et al. | |
| 2008/0046562 | A1 * | 2/2008 | Butler ........................... | 709/224 |
| 2008/0065386 | A1 * | 3/2008 | Cross et al. .................... | 704/270 |
| 2008/0104025 | A1 * | 5/2008 | Dharamshi et al. ............... | 707/3 |
| 2008/0114739 | A1 * | 5/2008 | Hayes ............................... | 707/3 |

(Continued)

OTHER PUBLICATIONS

Makeuseof.com, "Greasemonkey", Dec. 18, 2007, pp. 1-8 http://web.archive.org/web/20071218155417/http://www.makeuseof.com/tag/greasemonkey-firefox-addon/.*

(Continued)

*Primary Examiner* — Stephen Hong
*Assistant Examiner* — Mario M Velez-Lopez
(74) *Attorney, Agent, or Firm* — Fish & Richardson P.C.

(57) ABSTRACT

The subject matter of this specification can be embodied in, among other things, a method that includes selecting a plurality of web pages including static web page elements, generating first configuration information that specifies at least one of the static web page elements, and generating second configuration information that specifies at least one asynchronous web page element. Each asynchronous web page element corresponds to a particular static web page element specified in the first configuration information. The method also includes modifying the selected plurality of web pages. The modification includes parsing the plurality of web pages, identifying the static web page elements within the plurality of web pages that are also specified in the first configuration information, and replacing the identified static web page elements with the corresponding asynchronous web page elements specified in the second configuration information.

20 Claims, 10 Drawing Sheets

U.S. PATENT DOCUMENTS

| | | | | |
|---|---|---|---|---|
| 2009/0006454 | A1* | 1/2009 | Zarzar et al. | 707/102 |
| 2009/0300056 | A1* | 12/2009 | Fu et al. | 707/102 |
| 2010/0169353 | A1* | 7/2010 | Soetarman | 707/759 |
| 2010/0250424 | A1* | 9/2010 | Torres | 705/37 |

OTHER PUBLICATIONS

CSharpfriends.com, "Method Overloading", Oct. 6, 2006, pp. 1-2 http://web.archive.org/web/20061006103855/http://www.csharpfriends.com/Articles/getArticle.aspx?articleID=105.*

Webkit.org, "Regression Testing", Dec. 13, 2007, pp. 1-2 http://web.archive.org/web/20071213192520/http://webkit.org/quality/testing.html.*

Getfirebug.com, "CSS Layout", Dec. 22, 2007, pp. 1-2 http://replay.waybackmachine.org/20071222002707/http://www.getfirebug.comllayout.html.*

European Search Report & Written Opinion for Application No. EP 09251945.3-1225, dated Nov. 19, 2009, 7 pages.

* cited by examiner

SYNCHRONOUS TO ASYNCHRONOUS WEB PAGE CONVERSION

CROSS-REFERENCE TO RELATED APPLICATIONS

This application claims priority to Indian Application Serial No. 1660/MUM/2008, filed on Aug. 5, 2008, the contents of which are hereby incorporated by reference.

TECHNICAL FIELD

This instant specification relates to modifying electronic documents to include asynchronous components.

BACKGROUND

Many existing web sites for commercial entities include an extensive set of web pages that include static hypertext markup language (HTML) elements that require an entire web page to be refreshed before the element can modify the web page. Asynchronous elements, such as Asynchronous JavaScript and XML (Ajax) elements, may permit a portion of the web page to be modified without refreshing other portions; however, many web pages of existing large web sites may not yet incorporate these asynchronous elements due to the significant effort required to create new web pages for the web site that have asynchronous elements or to modify the existing web pages to include the asynchronous elements.

SUMMARY

In general, this document describes methods, systems, and computer program products for migrating, or mass converting, static hypertext markup language (HTML) components in a web page into asynchronous components that permit a browser to refresh the asynchronous components without refreshing the entire web page in which the asynchronous component is embedded. For example, static HTML elements can be replaced with Asynchronous JavaScript and XML (Ajax) components.

In a first general aspect, a computer-implemented method is described. The method includes selecting a plurality of web pages including static web page elements. Each static web page element lacks an ability to request information associated with a uniform resource identifier (URI) without refreshing an entire web page in which the static web page element is embedded. The method also includes generating first configuration information that specifies at least one of the static web page elements and generating second configuration information that specifies at least one asynchronous web page element that is configured to request information associated with a URI without refreshing an entire web page in which the asynchronous web page element is embedded. Each asynchronous web page element corresponds to a particular static web page element specified in the first configuration information.

The method also includes modifying the selected plurality of web pages. The modification includes parsing the plurality of web pages, identifying the static web page elements within the plurality of web pages that are also specified in the first configuration information, and replacing the identified static web page elements with the corresponding asynchronous web page elements specified in the second configuration information.

In a second general aspect, a system is described. The system includes one or more computers having a web page selector to select a plurality of web pages comprising static web page elements that each lack an ability to request information associated with a uniform resource identifier (URI) without refreshing a web page in which the static web page element is embedded, a configuration module to generate first configuration information that specifies at least one of the static web page elements and to generate second configuration information that specifies at least one asynchronous web page element that is configured to request information associated with a URI without refreshing an entire web page in which the asynchronous web page element is embedded. Each asynchronous web page element corresponds to a static web page element specified in the first configuration information.

The system also includes a web page modification module to modify the selected plurality of web pages. The modification includes parsing the plurality of web pages, identifying static web page elements specified in the first configuration information, and replacing the identified static web page elements with corresponding asynchronous web page elements specified in the second configuration information.

The systems and techniques described here may provide one or more of the following advantages. First, substantially "real-time" responses may be provided to users of web pages modified to include asynchronous elements. Additionally, improved usability and interactiveness may be provided to users of modified web pages. For example, web pages modified to include asynchronous elements may facilitate new functionality—such as collaboration between users. Moreover, reduced network traffic and improved responsiveness in web page loading may be achieved using web pages modified to include asynchronous elements.

Another advantage may include providing a way to migrate, or convert, an extensive set of web pages that incorporate static HTML controls to web pages that incorporating Ajax-enabled controls. Additionally, an automatic conversion process may be provided that does not require extensive user input to convert web pages in bulk. Moreover, faster development time may be achieved by providing reusable asynchronous components, templates including Ajax-enabled web page layouts and basic components, and search and replace features that permit substitution of static HTML elements with Ajax-enabled controls and elements.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for replacing static HTML elements on a web page with asynchronous elements such as Ajax components. For example, a web site may have tens or hundreds of web pages that each includes static HTML controls. The static HTML controls may require that the entire web page in which the controls are embedded refresh before the web page can be updated using the controls. For example, a web page may have a first dropdown box that lists states and a second dropdown box that lists cities. When a user selects a state from the first dropdown box, it may affect which cities are listed in the second dropdown box for the cities. If the web page includes static HTML dropdown boxes, the user may have to press a submit button, and the entire page may have to be refreshed in order to populate the second dropdown box when a state is selected; however, if the web page includes an Ajax-enabled dropdown box, the second dropdown box can be populated based on the selection of the state from the first dropdown box without having to refresh the entire web page but instead only refreshing the second dropdown box. Additionally, the second dropdown box can be immediately populated without additional interaction from the user (e.g., clicking a submit button).

Integrating asynchronous components (e.g., which can refresh asynchronously relative to the rest of a web page) into web pages may have several advantages including decreased response time to user interactions, improved usability and interactiveness, the ability to explore new functionality from rich platforms such as collaborative operation platforms, and lowering network traffic.

Figure 1:
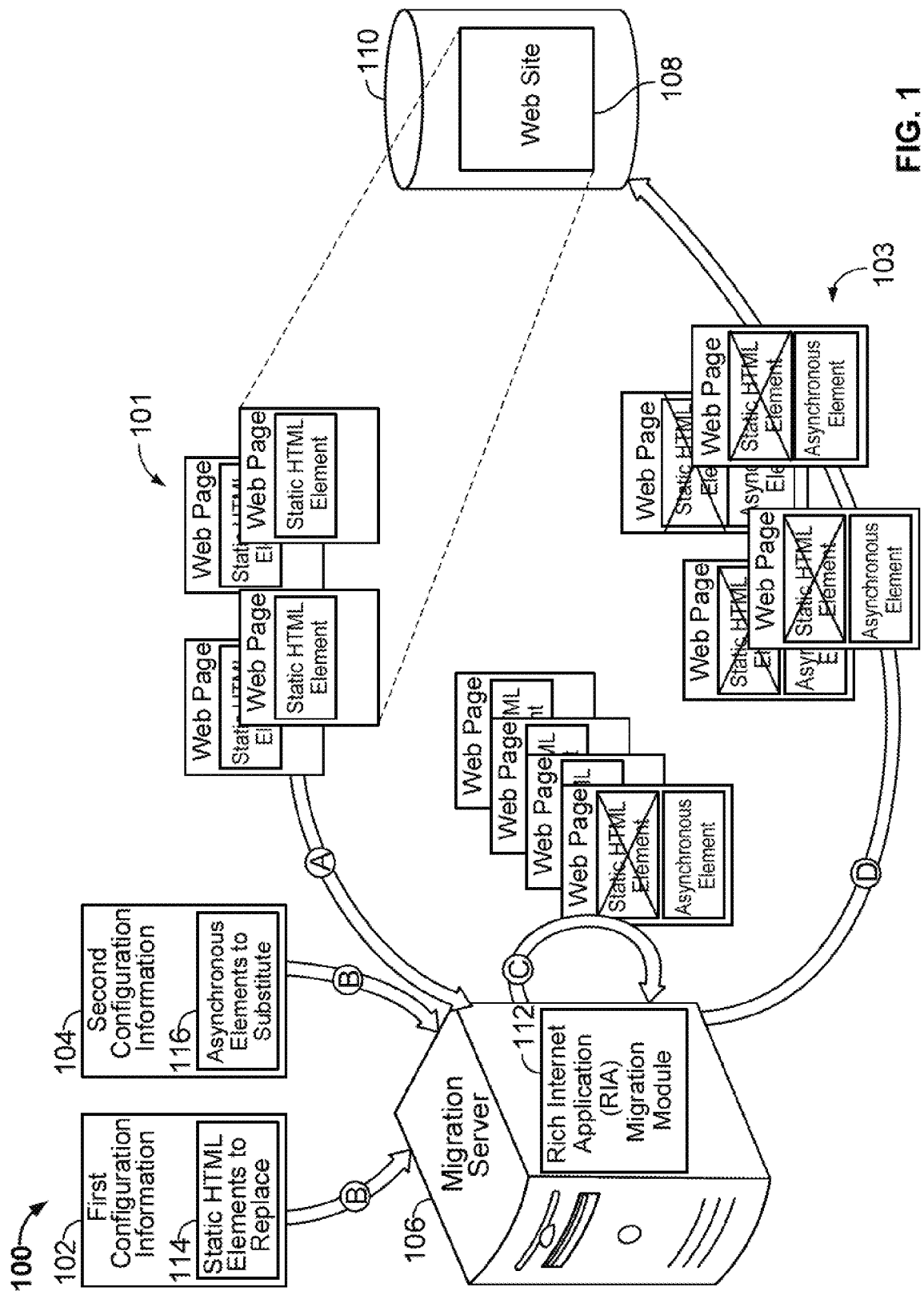
FIG. 1 is a diagram of an example system for automatically replacing static HTML elements in a plurality of web pages with asynchronous components.

FIG. 1 is a diagram of an example system 100 for automatically replacing static HTML elements in a plurality of web pages 101 with asynchronous components. In some implementations, the static HTML elements to be replaced and the asynchronous elements for use as replacements are specified by configuration information 102 and 104, respectively. For example, a migration server 106 can use the configuration information 102, 104 to process automatically the plurality of web pages 101 so that the HTML elements specified in the first configuration information 102 are replaced with asynchronous elements specified in the second configuration information 104. Although the first and second configuration information 102, 104 are illustrated as separate in FIG. 1, this information can be combined, for example, in a single configuration file.

In some implementations, a web site 108 for an organization may reside in a storage device 110 such as a hard drive on a web server. The migration server 106 can retrieve the one or more web pages 101 associated with the web site 108 as indicated by an arrow labeled "A."

A rich Internet application (RIA) migration module 112 may have previously created the first and second configuration information 102, 104. In some implementations, the RIA migration module 112 manages the migration, or conversion, of static HTML web pages to "rich Internet applications" that incorporate asynchronous web page elements. A user may have previously used the RIA migration module 112 to create or edit the first and second configuration information 102, 104. For example, the user can specify which static HTML elements to replace 114 and the asynchronous elements to use as replacements 116. This creation and editing of configuration information is subsequently described in more detail.

In some implementations, the RIA migration module 112 can access the first and second configuration information 102, 104, as indicated by arrows labeled "B." As indicated by an arrow labeled "C," the RIA migration module 112 can parse through the received web pages 101, identify static HTML elements that correspond to elements specified by the first configuration information 102, and bulk replace the identified static HTML elements with the asynchronous elements specified by the second configuration information 104.

In some implementations, the migration module 112 may transmit the modified web pages 103 back to the storage device 110.

Figure 2:
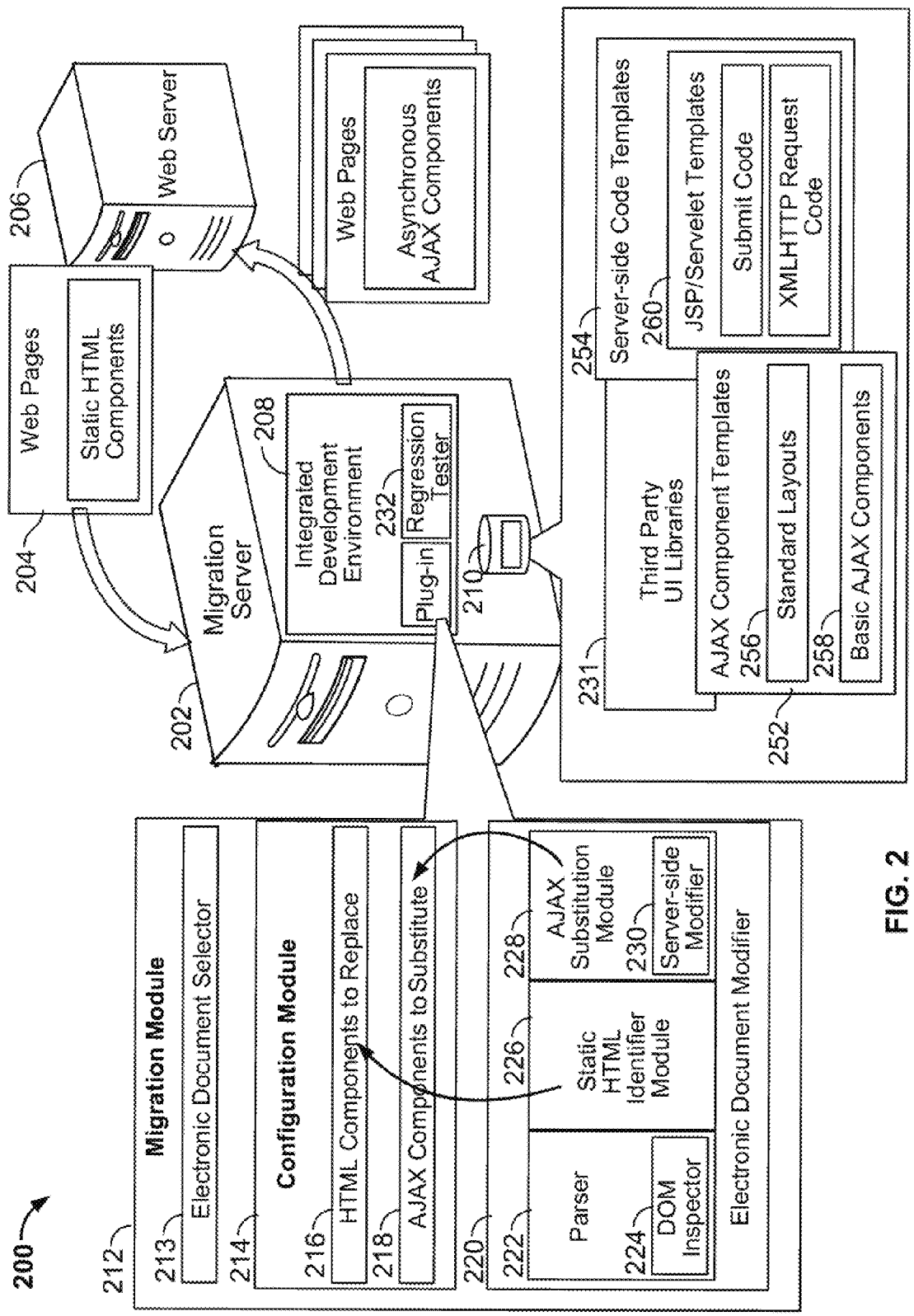
FIG. 2 shows a diagram of an example system for modifying web pages having static HTML elements so they include asynchronous elements such as Ajax elements.

FIG. 2 shows a diagram of an example system 200 for migrating web pages from static HTML elements to asynchronous elements such as Ajax elements. In some implementations, the system 200 includes a migration server 202 that performs the migration of web pages 204 received from a web server 206. In some implementations, the web server 206 is associated with a third party and stores the third party's web site. In other implementations, the web site and the associated web pages may be retrieved from a third-party web server and stored on the web server 206, which may be part of the migration server 202. In another implementation, the web pages may be retrieved and stored on an internal network connected with the migration server 202.

In some implementations, the migration server 202 can include an integrated development environment (IDE) and a database 210 that includes libraries and templates for use in modifying the web pages 204 to include Ajax or other asynchronous elements, for example, offline technologies (e.g., web services that function even when not connected to the Internet by enabling, for example, certain functionality to be performed by a client that is typically performed by a remote server as part of a web service, or components that permit integration with locally stored data such as text, video, or audio files), streaming technologies (e.g., audio or video streaming components), etc. In some implementations, the IDE may be the open-source Eclipse 3.0 platform developed in association with the Eclipse Foundation.

A migration module 212 may, in some implementations, leverage a framework associated with the IDE 208 to perform the addition of the asynchronous elements to the web pages 204. For example, the migration module 212 may be a plug-in to the IDE 208.

In some implementations, the migration module 212 can, for example, include an electronic document selector 214 for selecting electronic documents such as the web pages 204 from a collection of electronic documents. For example, a user can specify one or more web pages that the user wishes to modify to include asynchronous elements instead of static HTML elements.

In another implementation, the electronic document selector 214 can select electronic documents based on their content. For example, the electronic document selector 214 can analyze all of the web pages on the web site stored at the web server 206 and select the web pages that include one or more static HTML components specified in configuration information.

The migration module 212 can include, in some implementations, a configuration module 213 that generates configuration information such as which HTML components are to be replaced and which Ajax components are to be used in the replacement. For example, the configuration module 213 can generate a static HTML configuration file 216 that specifies static HTML elements to replace. In some implementations, the HTML element can be identified in the configuration file 216 by specifying one or more HTML-centric pieces of information such as an HTML tag (e.g., <table>), an HTML identifier (e.g., ID="BusScheduleTable"), an HTML event attribute (e.g., onblur, onclick, onchange,), etc.

The configuration module 213 can also generate an Ajax configuration file 218 that specifies which Ajax components are to replace the static HTML elements. Various implementations for generating the configuration file will be discussed in more detail below.

The migration module 212 may also include an electronic document modifier 220 that modifies the identified web pages 204 selected by the electronic document selector 214. For example, the electronic document modifier 220 can include a parser 222 that parses the received web pages 204. In some implementations, the parsing is performed using a document object model (DOM) inspector 224, which identifies HTML objects in the web pages 204.

The electronic document modifier 220 may also include a static HTML identifier module 226. The static HTML identifier module 226 can access the configuration file listing the static HTML components to be replaced. In some implementations, the static HTML identifier module 226 can compare the HTML elements listed in the configuration file 216 to elements found during inspection by the DOM inspector 224 to determine if the web pages 204 contain any of the specified static HTML elements.

If any specified static HTML elements are found, the electronic document modifier can use an Ajax substitution module 228 to replace the static HTML elements with corresponding Ajax components specified by the Ajax components configuration file 218.

The Ajax substitution module 228 can extract code from the Ajax configuration file 218 and insert it into the web page in place of the static HTML code. In some implementations, the Ajax substitution module 228 can delete the static HTML code when it substitutes the Ajax component code. In other implementations, the Ajax substitution module 228 can comment out the static HTML code in addition to adding the Ajax component code.

In some implementations, the Ajax substitution module 228 can include a server-side modifier 230, which modifies code that was used by the static HTML component to interact with one or more external web servers. For example, an online geographical map displayed by a web page may include arrows for each cardinal direction. The arrow may be a static HTML element. When a user selects the arrow, a web browser displaying the web page may make a request to a web server for additional map images that correspond to the direction that the arrow points. For example, if the user selects a "North" arrow, the web page can request more map images to the north of the currently displayed map images. In a static HTML implementation, the selection of the arrow may require that the entire web page be refreshed before displaying the requested map images.

In some implementations, the server-side modifier 230 can integrate some of the server-side code into the replacement Ajax components. For example, the server-side modifier 230 can identify the method used to request the map images and an address of the web server storing the map images. The server-side modifier 230 can integrate this information into the new Ajax component. For example, the static HTML element of the arrow may be replaced with an asynchronous element of the arrow. When the user selects the asynchronous element, the asynchronous element can request the appropriate map images without refreshing the entire page. Note that replacement of the static HTML arrow, with the asynchronous arrow may not alter the appearance of the arrow because the same image may be used. However, in some implementations, the code specifying attributes and functionality associated with the arrow may be modified so that it can initiate asynchronous communication with a web server.

In some implementations, the database 210 associated with the migration server 202 can include components used in the processing of the web pages 204. For example, such components can include Ajax component templates 252, server-side code templates 254, and third-party user interface (UI) libraries 231. The Ajax component templates 252 can include template pages with standard layouts 256 and basic Ajax-enabled components 258.

The server-side code templates 254 can include template code that is used to refactor, for example, Java Server Page (JSP)/servlet-based server-side code. In some implementations, the JSP/servlet templates 260 can include standard code use to add/update/delete a server-side operation being invoked by the erstwhile "submit" method. In other implementations, JSP/servlet templates 260 can include standard code used to add/update/delete the server-side operation to be invoked by an "XMLHttpRequest" method.

In some implementations, the third-party UI libraries 231 include asynchronous elements provided by various third parties. For example, a company such as Yahoo!, Inc. may develop an Ajax-enabled search box that accepts search terms from a user and initiates an internet search. Yahoo!, Inc. may provide the search box to others for integration into web pages. The third-party UI libraries 231 can include the search box as well as other Ajax-enabled components developed by individual programmers, organizations, or companies.

In some implementations, a user can use the third-party UI libraries 231 as well as the templates 252, 254 to modify one or more of the web pages 204. For example, the user can select Ajax-enabled components from the third-party UI libraries 231 to insert in place of static HTML elements. In another example, the user can select server side code from the server-side code templates 254 to modify the previous code associated with the static HTML elements. This is subsequently discussed in more detail.

The user's selections of asynchronous components and templates for a web page can be saved in configuration files for use in processing additional subsequent web pages according to some implementations. For example, if the user selects an Ajax-enabled dropdown box from the third-party UI library 231 to replace a particular static HTML element, the selection can be included in the configuration file 218 that specifies Ajax components to substitute for the static HTML components. The migration module can then insert the selected Ajax-enabled dropdown box wherever the static HTML element occurs.

After the web pages 204 have been processed by the migration module 212, the IDE can deploy and perform regression testing on the modified web pages to identify any functional errors occurring because of the changes. For example, if the IDE 208 is the Eclipse program 3.0 developed in association with Eclipse Foundation, it may include a regression tester 232 as part of the Europa feature set of Eclipse 3.0. After successful testing, the migration server 202 can transmit the modified web pages back for deployment on the web server 206.

Figure 3:
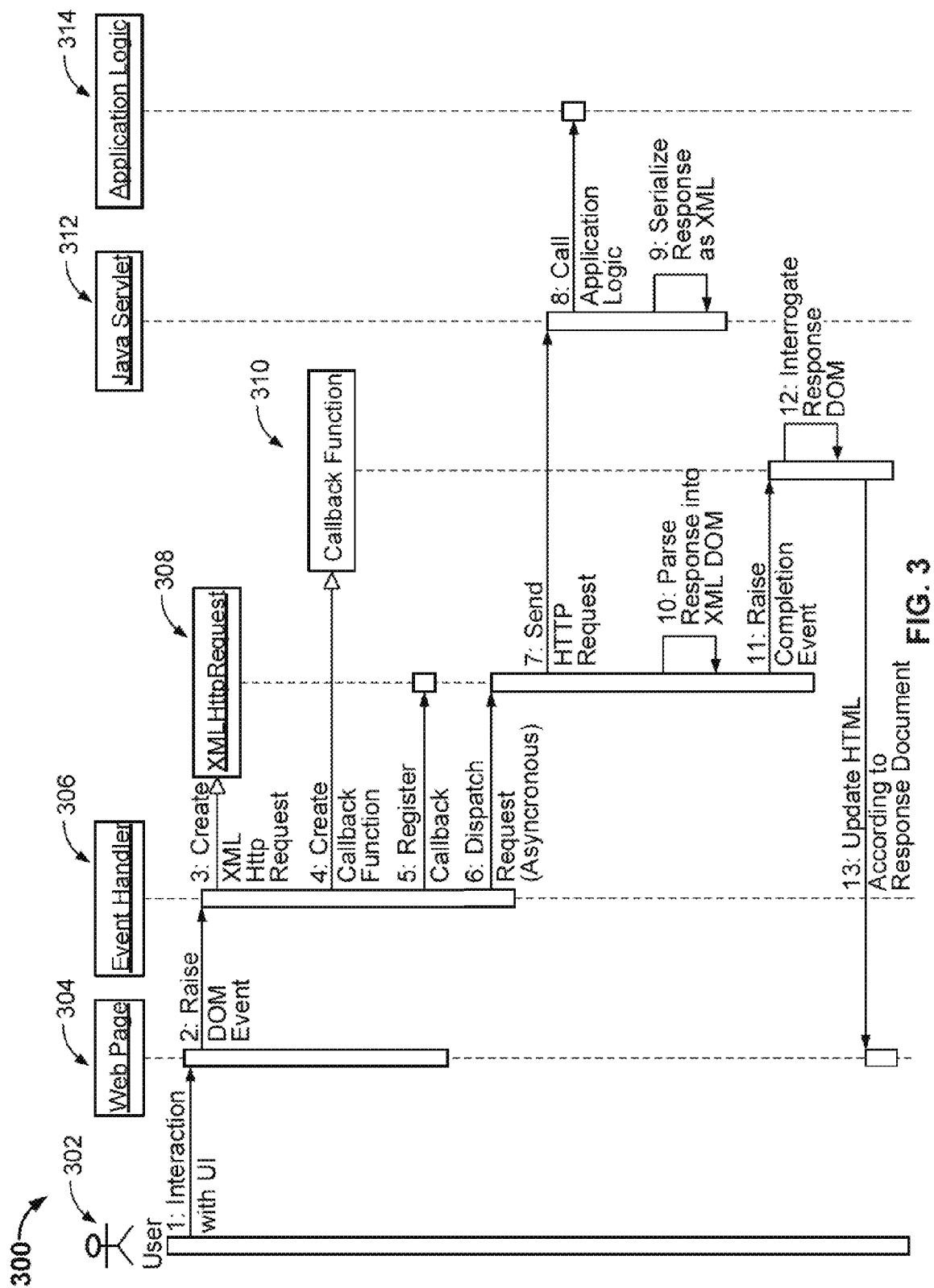
FIG. 3 shows a sequence diagram of an example asynchronous web flow for an asynchronous element.

FIG. 3 shows a sequence diagram of an example asynchronous web flow 300. In this example, the asynchronous element is an Ajax-enabled component embedded in a web page that receives an interaction from a user. The component asynchronously submits a request to a remote application, which returns requested information for display or other manipulation by component. This is one example of the function of an asynchronous element and is not intended to be limiting, but is instead presented for the purposes of illustrating one possible type of asynchronous interaction.

More specifically, the web flow 300 includes seven "actors": a user 302, a web page 304, an event handler 306, an XMLHttpRequest 308, a callback function 310, a Java servlet 312, and application logic 314.

In some implementations, the user 302 performs an interaction with the asynchronous component embedded on the web page 304. The interaction can raise a DOM event that is transmitted to the event handler 306. The event handler can create the XMLHttpRequest 308, create the callback function 310, register the callback function 310 with the created XMLHttpRequest, and asynchronously dispatch the request via the created XMLHttpRequest 308.

The XMLHttpRequest 308 can transmit a request for information to the Java servlet 312, which in turn, calls the application logic 314 that manages the information requested by the Ajax-enabled component. The Java servlet 312 can serialize the response from the application logic 314 into an XML representation, which is then parsed into the XML DOM by the XMLHttpRequest 308. The XMLHttpRequest 308 can raise a completion event that is transmitted to the callback function 310, which can interrogate the parsed DOM to determine what information was communicated from the application logic.

The callback function 310 can update the HTML of the web page to reflect the received information (e.g., add new information to a dropdown list or a table) that was determined based on the interrogation.

Figure 4A:
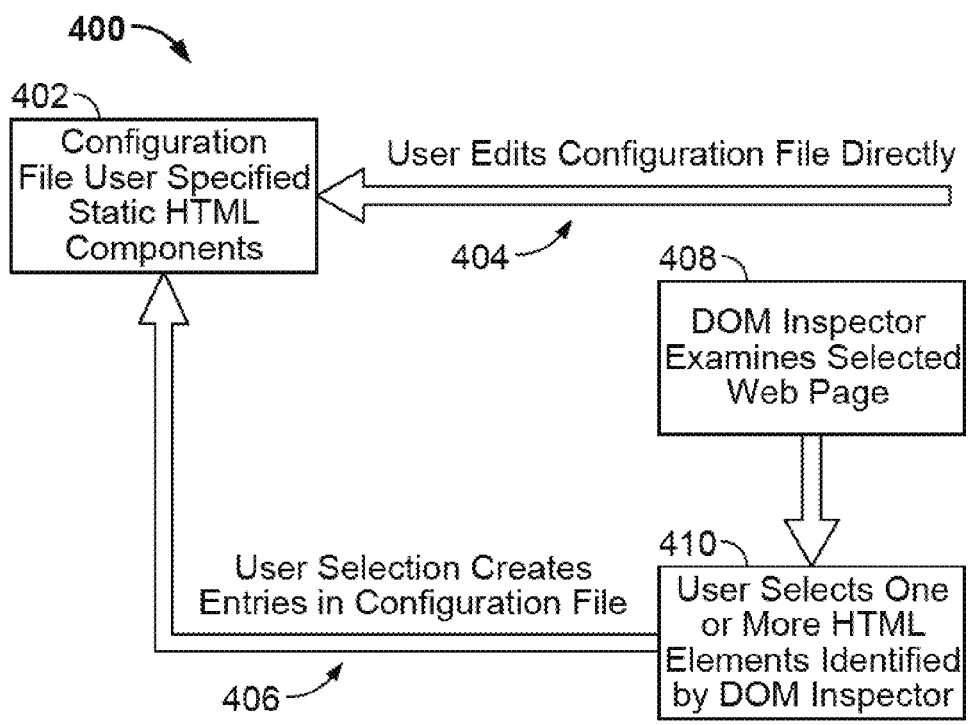
FIGS. 4A and 4B are an example diagram 400 and an example UI window 450 used to identify static HTML components, respectively.
Figure 4B:
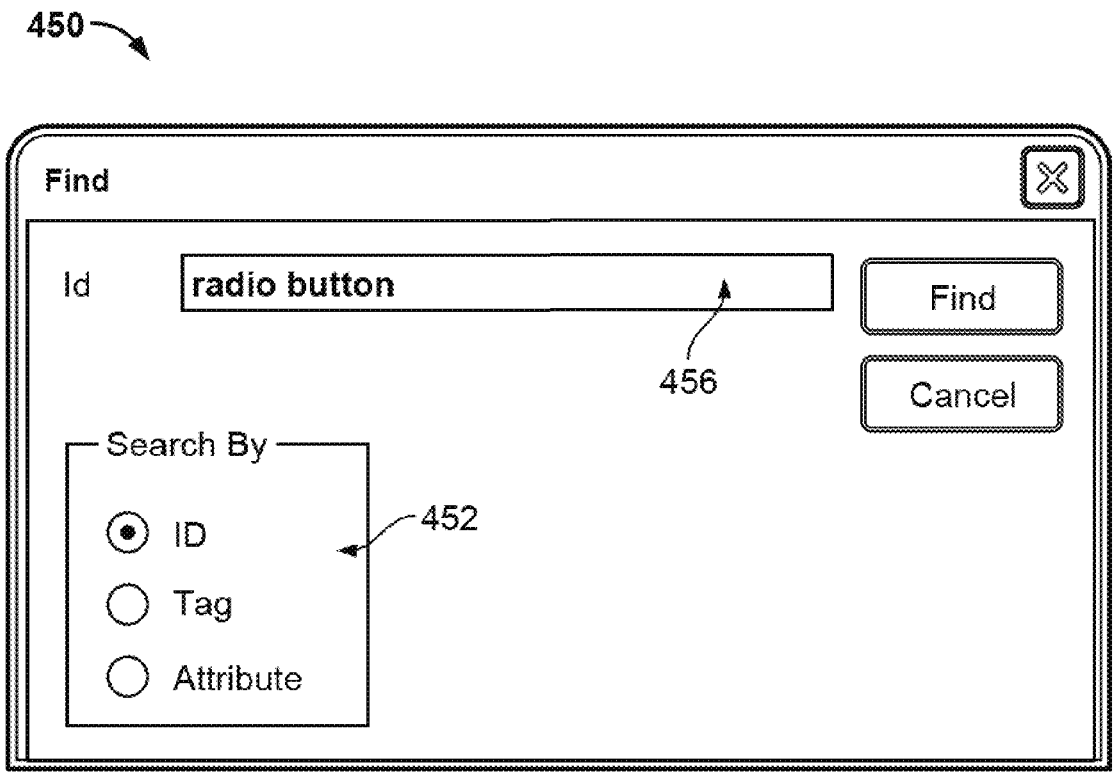

FIGS. 4A and 4B are, respectively, an example diagram 400 and an example UI window 450 used to identify static HTML components. The diagram 400 shows a configuration file 402 that records user-specified static HTML components. An arrow 404 illustrates that the user can edit the configuration file directly. For example the user can open a text editor and insert information such as an HTML tag, ID, or attribute that identifies the static HTML components that the user wishes to update. In some implementations, the configuration file 402 can be an XML file.

The arrow 406 illustrates that the user also can edit the configuration file indirectly. For example, a DOM inspector may examine selected web pages and display one or more elements of the web pages on a UI (as indicated by a box 408). The user can select one or more HTML elements identified by the DOM inspector (as indicated by box 410), and the user selection can be translated into an identifier for that HTML element that is inserted into the configuration file 402.

Some examples of HTML elements, or controls, that can be specified in the configuration file 402 include lists (e.g., directory lists, definition list, list items, menu lists, ordered lists), tables (e.g., table column groups, table columns, table rows, table data cells, table header cells), options (e.g., option selectors, multi-line text input), and input fields (e.g., search boxes).

Additionally, the migration module 212 may permit a user to inspect HTML elements of one or more web pages using a DOM inspector 224. For example, a user can select a web page to modify and enable an "inspect mode." The user can select one or more of several types of information to display about the selected web page. In some implementations, the information displayed can include DOM nodes, Cascading Style Sheets (CSS) rules, computed styles (e.g., CSS which are updated at run time), and JavaScript objects.

In some implementations, the user also can search for an HTML element by ID, tag, or attribute as illustrated by FIG. 4B. A user can select one of these items to search by using, for example, radio buttons 452 specifying each of the items that a user can search by. The user may type identifying information associated with the selected item. For example, the user may select the item specifying that he wishes to search by HTML ID. The user also may enter the ID "radio button" in a text input box 454. The user can then initiate a search for HTML elements having this ID by pressing the find button and the migration module 212 can search through the parsed web pages to find all of the HTML elements associated with the "radio button" ID.

In some implementations, the user can select asynchronous components to replace the located HTML elements associated with the input ID. For example, the user may select an asynchronous element in another window (not shown), and the user may initiate a find and replace operation to replace the specified static HTML element with the selected asynchronous element.

Additionally, the DOM Inspector can output the identified HTML elements in the web pages to a XML file. The UI may access the XML file and highlight code associated with the identified HTML elements in a screen that displays code for one or more web pages.

Figure 5:
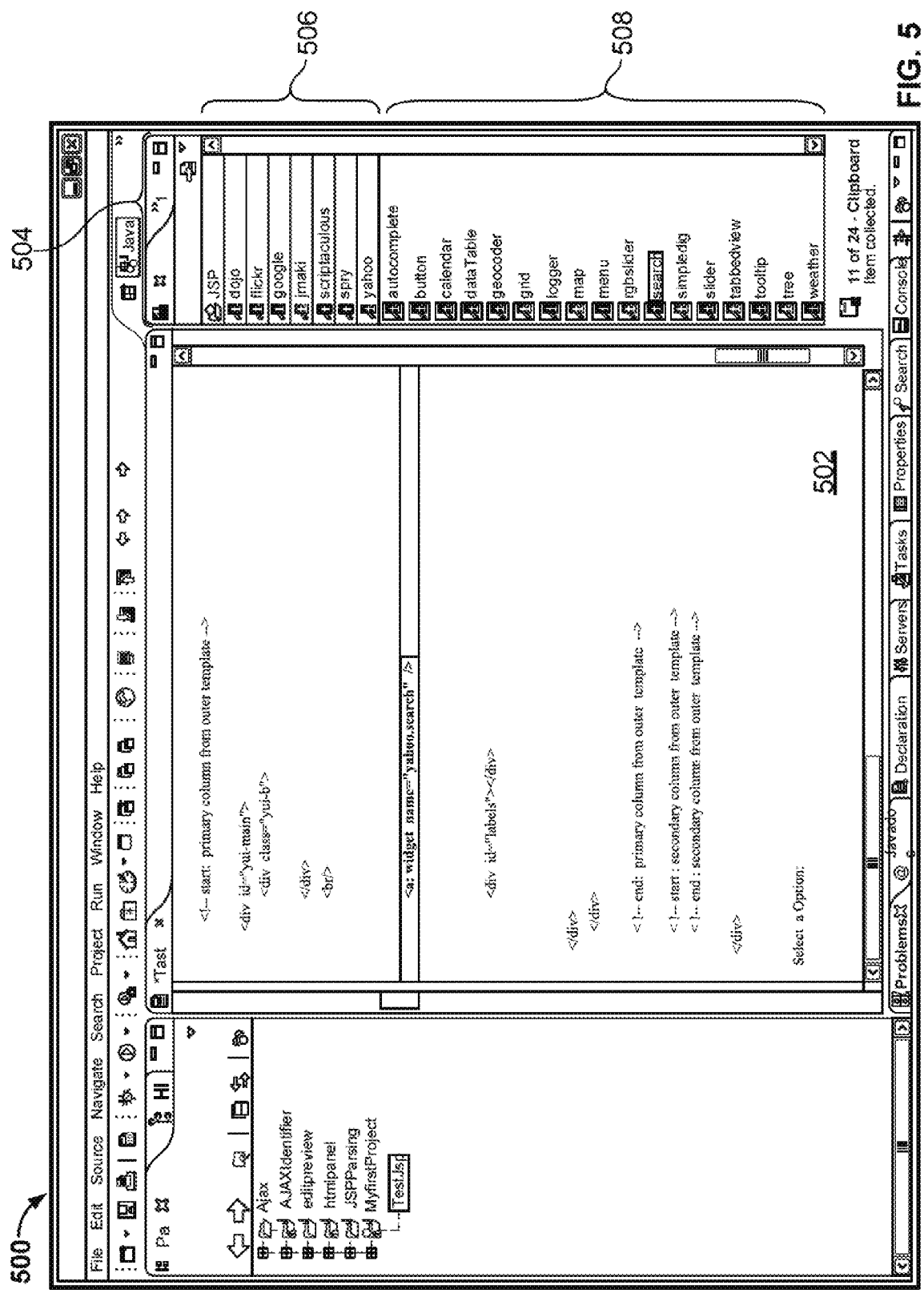
FIG. 5 is a screenshot of an example UI for displaying HTML elements.

One example of an UI for displaying the HTML elements is shown in an example screenshot 500 of FIG. 5. The screenshot 500 includes a display window 502 that shows the HTML code for a selected web page. The screenshot 500 also includes a UI library pane 504 that displays available asynchronous UI components. For example, the source of UI components, such as a company that created the component(s) can be displayed in the library pane 504 as items 506. In some implementations, a user can select an item labeled with a developer name to see all of the asynchronous components associated with a developer. For example, if a user selects the developer YAHOO!, the UI can display several asynchronous components 508 developed by YAHOO!.

In some implementations, a user can drag and drop an asynchronous component onto a portion of the web page displayed by the display window 502. In the example of FIG. 5, the user selects an Ajax-enabled search element from the UI library pane 504 and places it within the displayed web page.

In some implementations, the asynchronous element can be dragged over or on top of a static HTML element identified by the display window 502. For example, the search element, or widget, from YAHOO! can be dragged over a static search element (which is highlighted within the display window 502 for easy identification by a user). In some implementations, the code associated with asynchronous element may replace the code onto which it was dropped. In other implementations, code associated with the asynchronous element may be added to the web page and code associated with the static HTML may be commented out so that it is not displayed when a web browser executes the web page.

In some implementations, a program used to modify the web pages such as the program shown in the screenshot 500 can display information about a particular DOM node or sub-tree identified by a DOM inspector. In one implementation, a program can present individual DOM nodes and their values in an active, sortable list. For example, HTML attributes can be displayed as sub-nodes of HTML elements. A user may right-click on individual items in the list to see a context menu that permits the user to edit the values of those attributes. For example, a table element may typically display DETAIL data which changes based on values in a MASTER section (e.g., a portion—the DETAIL section—of a bus schedule table can be updated based on entering a departure time into an input box—the MASTER section). A user can use this dynamic capability of the program to modify attributes of the table (e.g., change the table background color, add a border, etc.).

Figure 6:
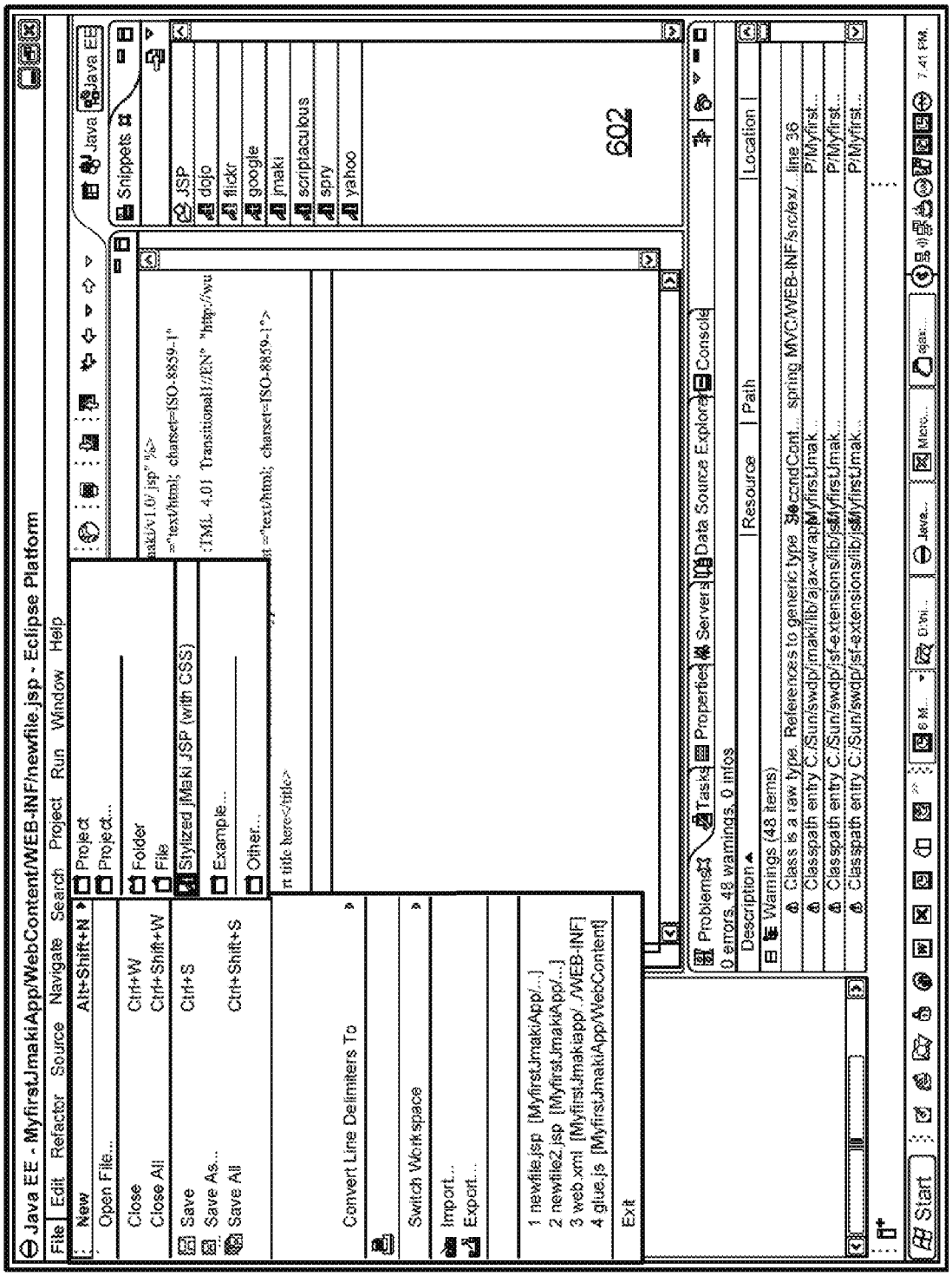
FIG. 6 is a screenshot of an example UI for creating asynchronous-enabled web pages.

FIG. 6 is a screenshot of an example UI 600 for creating asynchronous-enabled web pages. A user may use the UI 600 to create a new web page to add to a set of existing web pages. The new web pages can be built using templates having standard, or pre-configured, layouts and basic Ajax-enabled controls available for embedding in the standard layouts.

In some implementations, the standard layout can include a web page having a primary display area in the center of the page with sidebars located at one or more sides of the display area and used to display additional content. The standard layouts can also include headers, footers, columns, etc.

As shown in the example UI 600, a user can select a "New" menu item to open a submenu that includes a submenu item labeled "stylized jMaki JSP (with CSS), which initiates the creation of a stylized JSP web page having CSS capabilities.

Figure 7:
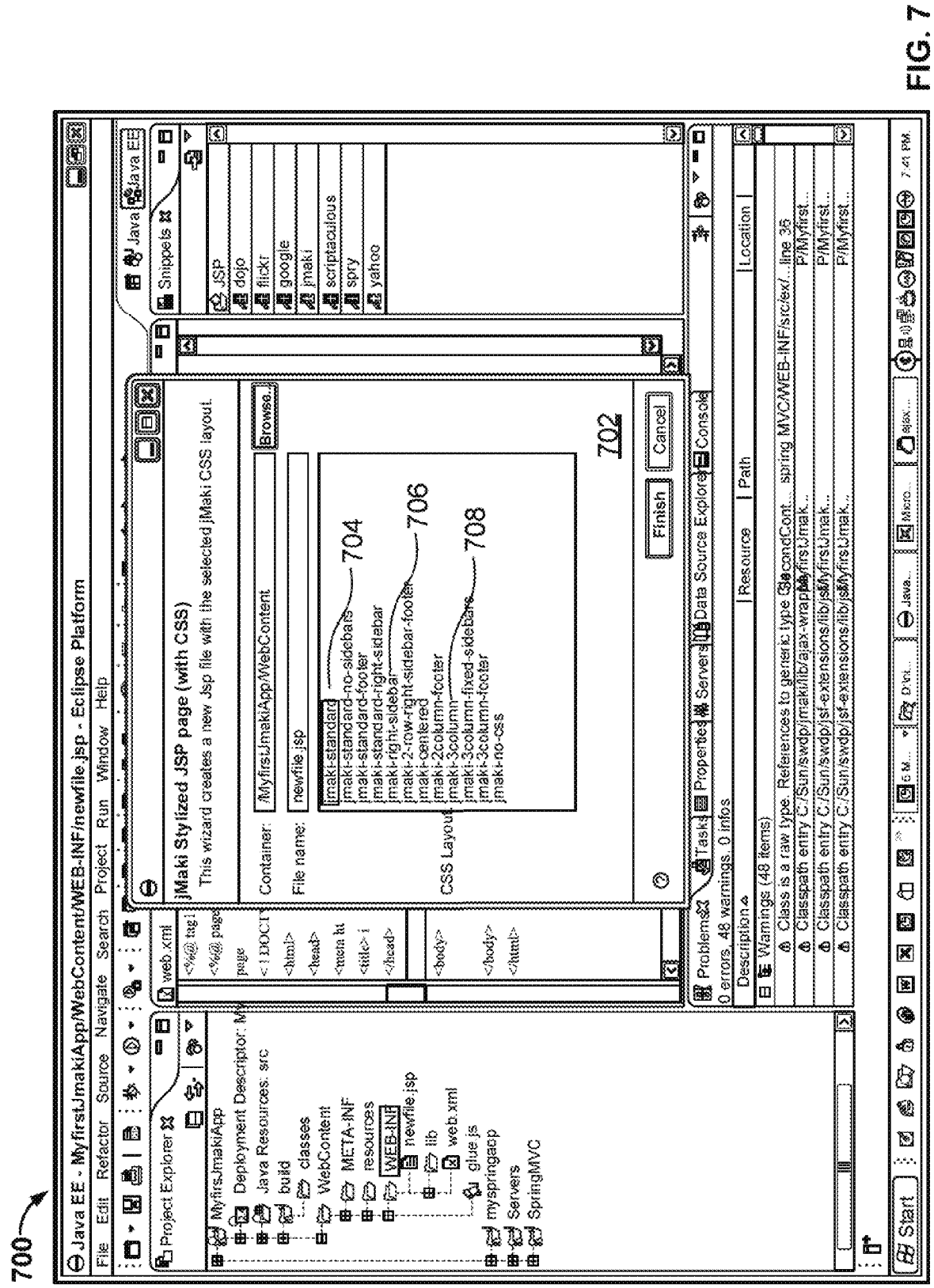
FIG. 7 is a screenshot of an example selection window that permits a user to select a type of CSS layout to use in a creation of a stylized JSP.

In some implementations, the example UI 600 may also include an additional selection window 702 that permits a user to select a type of CSS layout to use in the creation of the stylized JSP as shown in FIG. 7. For example, the user can select a "standard" layout 704 with a single display area, a layout 706 with a right-sidebar, or a layout 708 where the display area is segmented into three columns.

The user can select basic Ajax-enabled controls from a snippet dashboard 602 (FIG. 6) to include in the generated standard layout. As discussed previously, the Ajax enable controls may be included in various vendor libraries developed by third parties. In some implementations, the Ajax-enabled controls include combo boxes, date selection calendars, tables, tabbed views, search boxes, sliders, etc.

Figures 8A, 8B:
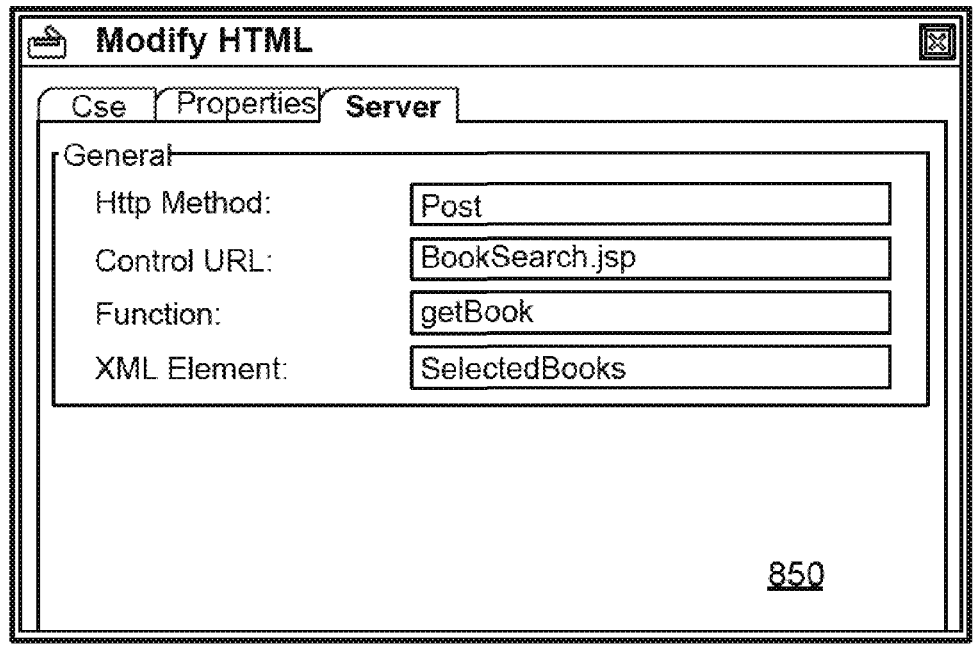
FIGS. 8A and 8B are screenshots of example UIs for modifying server-side code so that the code is compatible with an asynchronous element substituted for a static HTML element previously associated with the server-side code.

FIGS. 8A and 8B are screenshots of example UIs for modifying server-side code so that the code is compatible with an asynchronous element substituted for a static HTML element previously associated with the server-side code. FIG. 8A shows an example UI 800 for commenting out server-side code associated with a static HTML element.

For example, a non-Ajax-enabled web page may retrieve a list of books for display in a dropdown box based on a query entered by a user. The non-Ajax-enabled web page may accept the user input in a text box, and post this information (e.g., via a doPost method) to a web server having a database of book information after the user clicks a submit button on the web page.

The user may wish to replace this synchronous functionality with an asynchronous dropdown box that automatically populates—e.g., without pressing the submit button and without refreshing the entire web page—after text is entered in the textbox. The new modified web page will not retrieve a list of books for display upon a selection of the submit button. In some implementations, the UI 800 can include a dialog box to comment out the invocation of a "getBook" method 802 that causes the web server to retrieve a list of books.

FIG. 8B is a screenshot of an example UI 850 for configuring Ajax-components. For example, the UI 850 can configure the new asynchronous dropdown box. In some implementations, a user can specify a server-side method that an Ajax-enabled element should call asynchronously. The user may also specify a control uniform resource locator (URL) and an XML element required by the XMLHttpRequest to refresh the asynchronous element with results from the web server.

In the example given above where the asynchronous element is a dropdown box, the user may specify that the HTTP method to override is the doPost, or do Get, method. The user may specify the control URL, that is, the method invoked on the web server to retrieve the list of books. In this example, the method is called "BookSearch.jsp." The user can specify that the method that should be called from the new asynchronous control is the new "getBook" method, and that the XML Element used by the XMLHttpRequest to retrieve the information asynchronously from the server is labeled "SelectedBooks."

In some implementations, once the server-side code is specified for an asynchronous element on one web page, the code may be inserted and/or modified for the same asynchronous element present in other web pages without further user involvement.

Figure 9:
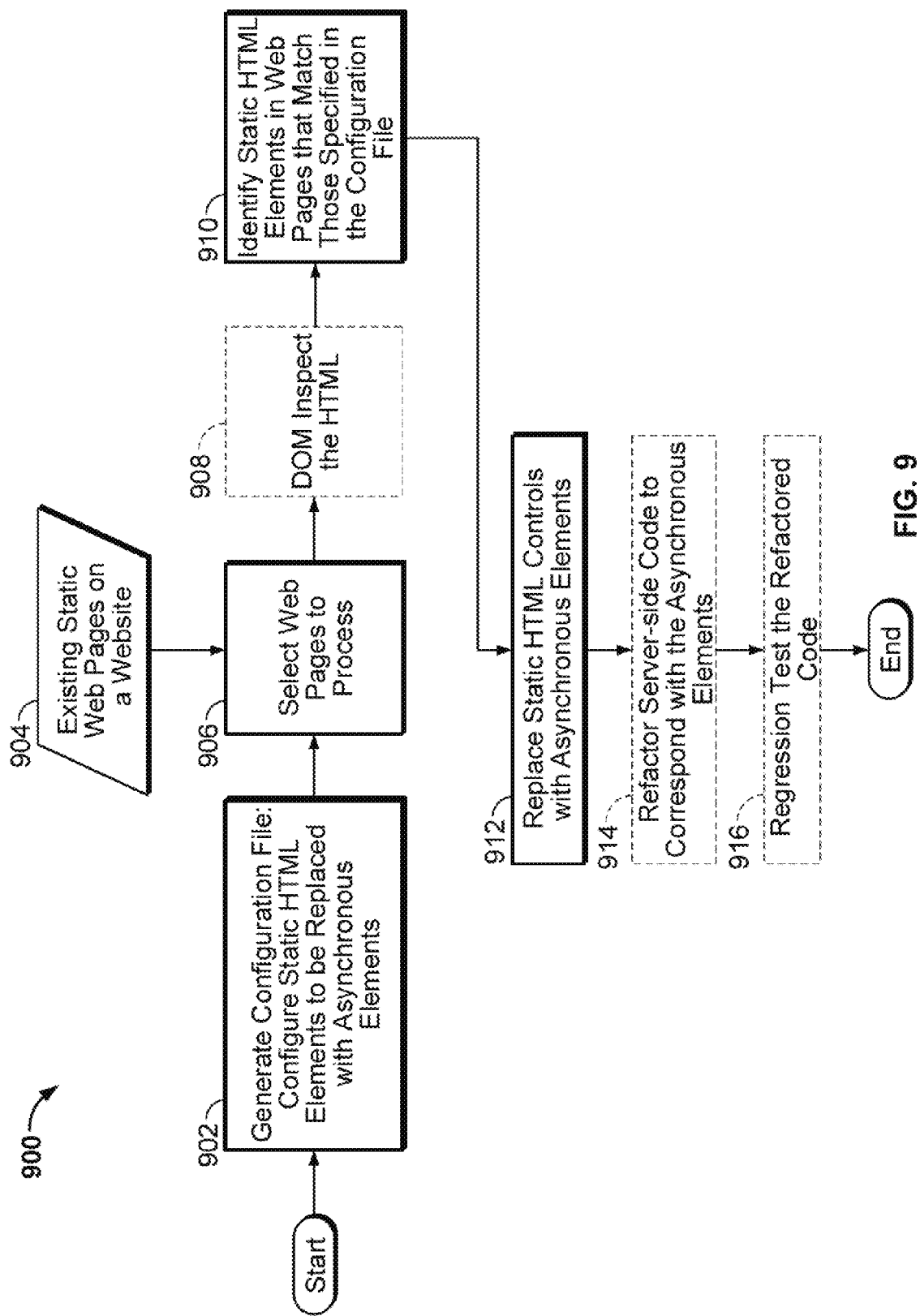
FIG. 9 is a flow diagram of an example method for replacing static HTML elements in web pages with asynchronous elements.

FIG. 9 is a flow diagram of an example method 900 for replacing static HTML elements in web pages with asynchronous elements. The method 900 may be performed, for example, by a system such as the systems 100, 200 and using the UIs of FIGS. 6-8b, for clarity of presentation, the description that follows uses the systems 100, 200 and the UIs as the basis of an example for describing the method. However, another system, or combination of systems, may be used to perform the method 900.

In box 902, one or more configuration files are generated, where the configuration files are used to specify static HTML elements that are to be replaced with asynchronous elements. For example, the migration module 112 can generate the configuration information 102, 104 based on user input specifying the static HTML element and the corresponding asynchronous element to serve as a substitute.

In another implementation, a portion of the configuration information can be generated based on user action with a UI such as the one shown in the screenshot 500 of FIG. 5. For example, dragging and dropping an asynchronous component onto a static HTML element may create an entry in the configuration information specifying the asynchronous element for use in the replacement. The entry can include which static HTML element the asynchronous element should replace based on which HTML element the asynchronous element was placed upon.

In box 904, existing static web pages from a web site are provided. For example, the web pages 101 are provided to the migration server 106.

In box 906, web pages are selected to process. For example, one or more of the web pages 101 can be selected for modification to include asynchronous element. In some implementations, a user may identify particular web pages using a selection window that displays the web pages. In another example, the migration module 112 can automatically select web pages that have a static HTML element that the user specified should be replaced. For example, the migration module 112 may select all web pages that include forms that update fields synchronously after a button is pressed.

In optional box 908, the HTML of the web sites may be DOM inspected. For example, the DOM inspector 224 can identify HTML elements within the selected web pages and create a hierarchical tree of DOM nodes that represent, for example, HTML elements and their attributes.

In box 910, static HTML elements within the selected web pages that match those specified in the configuration file can be identified. For example, the static HTML identifier module 226 can compare HTML tags specified in the configuration file 216 to tags listed as attributes in DOM nodes.

In box 912, static HTML controls can be replaced with asynchronous elements. For example, the UI of FIG. 5 may highlight static HTML elements within a web page. The user can select an asynchronous element to replace the static HTML element. In some implementations, the migration module 112 can proceed to replace automatically the same static element with the selected asynchronous element in other selected web sites. In other implementations, the asynchronous element used to replace the static HTML elements may be pre-specified by the user (e.g., the user may generate an XML file that specifies the asynchronous elements to use the substitutes) and the migration module 112 may replace the entire static HTML element without additional user intervention.

In optional box 914, the server-side code can be refactored to correspond with the asynchronous elements. For example, the user may use UIs similar to those shown in FIGS. 8A and 8B to select functions for overriding and association with the new asynchronous element.

In optional box 916, the modified code can be regression tested to identify any errors or malfunctioning in the web page. For example, the regression tester 232 of the IDE 208 can test the asynchronous elements of the modified web pages to determine if they operate correctly. In some implementations, the modified (or any newly created) web pages can be displayed to a user to determine if the format or appearance is as desired. After box 916, the method 900 can end.

Figure 10:
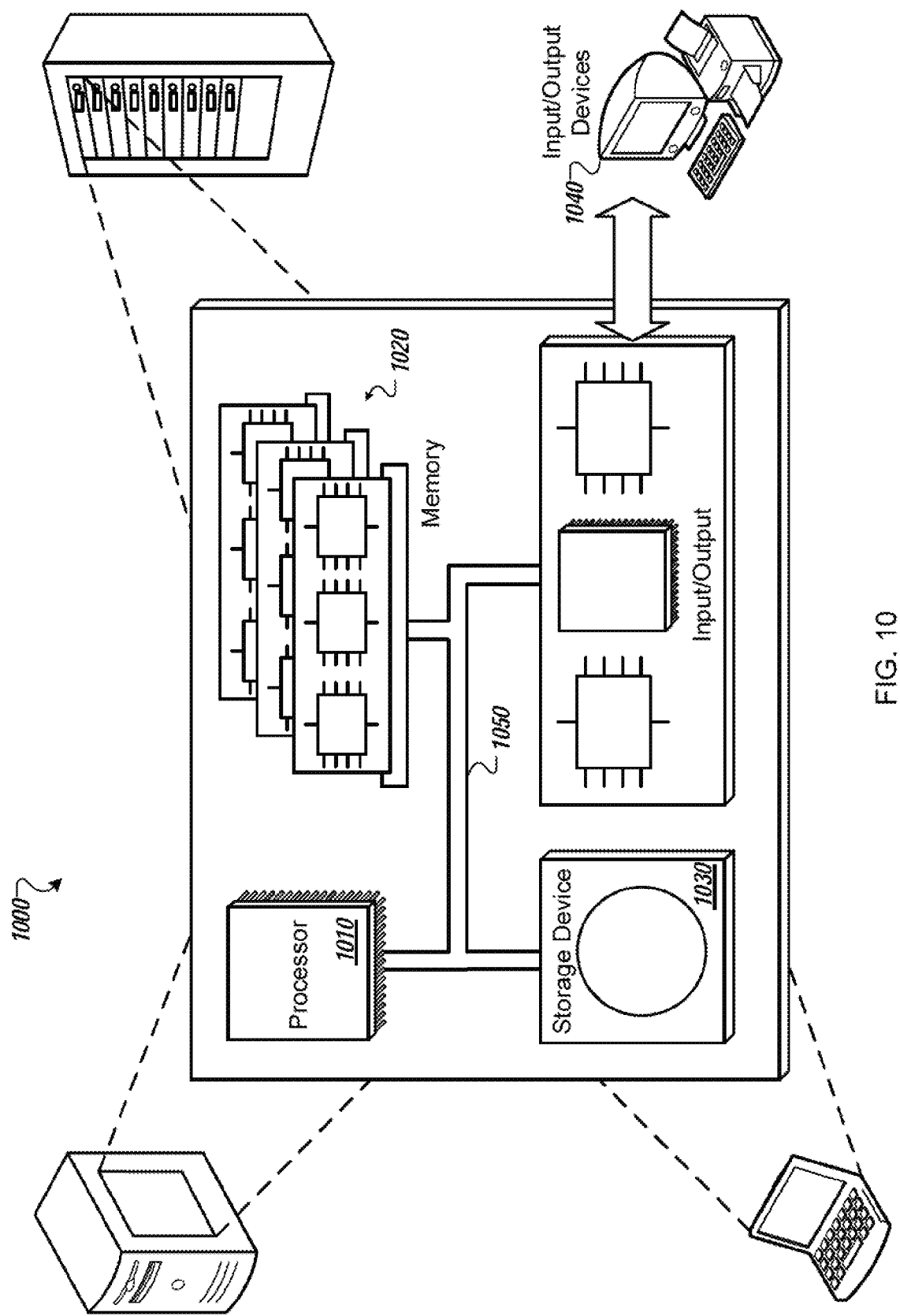
FIG. 10 is a diagram of a computer system that may implement one or more of the previously described systems or methods.

FIG. 10 is a schematic diagram of a computer system 1000. The system 1000 can be used for the operations described in association with any of the computer-implement methods described previously, according to one implementation. The system 1000 is intended to include various forms of digital computers, such as laptops, desktops, workstations, personal digital assistants, servers, blade servers, mainframes, and other appropriate computers. The system 1000 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. The processor may be designed using any of a number of architectures. For example, the processor 1010 may be a CISC (Complex Instruction Set Computers) processor, a RISC (Reduced Instruction Set Computer) processor, or a MISC (Minimal Instruction Set Computer) processor.

In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, from a storage device, one or more web pages comprising a plurality of static web page elements, each static web page element lacking an ability to request information associated with a uniform resource identifier (URI) without entirely refreshing a web page in which the static web page element is embedded;
accessing first configuration information that specifies at least one of the static web page elements;
accessing second configuration information that specifies at least one asynchronous web page element that is configured to request information associated with a URI without entirely refreshing a web page in which the asynchronous web page element is embedded, wherein each asynchronous web page element corresponds to a particular static web page element specified in the first configuration information; and
performing an automatic conversion process on the one or more web pages to provide respective one or more modified web pages, the automatic conversion process referencing the first configuration information and the second configuration information and comprising, for each web page:
parsing the web page;
identifying one or more static web page elements within the web page, the one or more static web page elements being specified in the first configuration information;
replacing the one or more static web page elements with respective one or more asynchronous web page elements specified in the second configuration information; and
transmitting the one or more modified web pages to the storage device.

2. The method of claim 1, wherein the at least one asynchronous web page element comprises an asynchronous JavaScript and extensible markup language (AJAX) element.

3. The method of claim 1, wherein each of the one or more static web page elements comprises a hypertext markup language (HTML) element.

4. The method of claim 1, wherein the respective one or more asynchronous web page elements that replace the one or more static web page elements perform substantially the same function as the replaced static web page elements.

5. The method of claim 1, wherein parsing the web page comprises using a document object model (DOM) inspector to inspect components of the web page.

6. The method of claim 1, wherein replacing the one or more static web page elements with the respective one or more asynchronous web page elements comprises removing code that is associated with the one or more static web page elements from the web page and inserting code that is associated with the respective one or more asynchronous web page elements in the web page.

7. The method of claim 1, wherein the one or more static web pages are associated with the same internet domain.

8. The method of claim 1, wherein each asynchronous web page element is configured to request the information without refreshing the entire web page using an XMLHttpRequest application programming interface (API).

9. The method of claim 1, wherein replacing the one or more static web page elements with the respective one or more asynchronous web page elements comprises overloading one or more methods associated with the one or more static web page elements.

10. The method of claim 9, further comprising receiving input from a user specifying a first client-side method to overload and a second server-side method executed by a remote server that an asynchronous web page element is configured to call.

11. The method of claim 1, further comprising executing regression testing on the one or more modified web pages to determine if the replacement asynchronous web page elements generate errors when executed by an internet browser.

12. The method of claim 1, wherein generating the second configuration information comprises receiving user selections of asynchronous web page components from a repository of reusable asynchronous web page components.

13. The method of claim 1, wherein identifying one or more static web page elements in the web page comprises prominently displaying an identified static web page element to a user.

14. The method of claim 13, further comprising receiving from a user a selection of an asynchronous web page element to replace the prominently displayed static web page element.

15. The method of claim 14, wherein the selection comprises dragging and dropping a visual representation of the asynchronous web page element on the prominently displayed static web page element.

16. The method of claim 14, wherein the selection is used to generate at least a portion of the second configuration information, which is used to replace substantially similar static web page elements with the user selected asynchronous web page element without additional user interaction.

17. The method of claim 1, wherein the second configuration information that specifies at least one asynchronous web page element identifies the asynchronous web page element based on a group of identifiers consisting of DOM node identifiers, CSS style identifiers, JavaScript Object identifiers, computed style, HTML IDs, HTML tags, and HTML attributes.

18. A system comprising:
a storage device; and
one or more computers comprising a web page selector to receive, from the storage device, one or more web pages comprising static web page elements, each static web page element lacking an ability to request information associated with a uniform resource identifier (URI) without entirely refreshing a web page in which the static web page element is embedded;

a configuration module to access first configuration information that specifies at least one of the static web page elements and to access second configuration information that specifies at least one asynchronous web page element that is configured to request information associated with a URI without entirely refreshing a web page in which the asynchronous web page element is embedded, wherein each asynchronous web page element corresponds to a static web page element specified in the first configuration information; and a migration module to perform an automatic conversion process on the one or more web pages to provide respective one or more modified web pages, wherein the automatic conversion process references the first configuration information and the second configuration information and comprises, for each web page:
  parsing the web page;
  identifying one or more static web page elements within the web page, the one or more static web page elements being specified in the first configuration information;
  replacing the one or more static web page elements with respective one or more asynchronous web page elements specified in the second configuration information; and
transmitting the one or more modified web pages to the storage device.

19. A computer program product tangibly embodied in a computer readable storage device, the computer program product including instructions that, when executed, perform operations for adding asynchronous functionality to web pages, the operations comprising:

receiving, from a storage device, one or more web pages comprising a plurality of static web page elements, each static web page element lacking an ability to request information associated with a uniform resource identifier (URI) without entirely refreshing a web page in which the static web page element is embedded;

accessing first configuration information that specifies at least one of the static web page elements;

accessing second configuration information that specifies at least one asynchronous web page element that is configured to request information associated with a URI without entirely refreshing a web page in which the asynchronous web page element is embedded, wherein each asynchronous web page element corresponds to a particular static web page element specified in the first configuration information; and performing an automatic conversion process on the one or more web pages to provide respective one or more modified web pages, the automatic conversion process referencing the first configuration information and the second configuration information and comprising, for each web page:
  parsing the web page;
  identifying one or more static web page elements within the web page, the one or more static web page elements being specified in the first configuration information;
  replacing the one or more static web page elements with respective one or more asynchronous web page elements specified in the second configuration information; and
transmitting the one or more modified web pages to the storage device.

20. The computer program product of claim 19, wherein the asynchronous web page elements comprise AJAX elements, audio or video streaming elements, or offline elements that enable a user to interact with a web page while unconnected to a server typically in communication with the offline element.

* * * * *